March 24, 1970  YASUO SEKI  3,502,949

THIN FILM SOLID ELECTROLYTE CAPACITOR

Filed April 10, 1968

INVENTOR.
YASUO SEKI
BY
Hopgood & Calimafde
ATTORNEYS

United States Patent Office 3,502,949
Patented Mar. 24, 1970

3,502,949
THIN FILM SOLID ELECTROLYTE CAPACITOR
Yasuo Seki, Tokyo, Japan, assignor to Nippon Electric Company Limited, Tokyo, Japan
Filed Apr. 10, 1968, Ser. No. 720,158
Claims priority, application Japan, Apr. 15, 1967, 42/23,945
Int. Cl. H01g 9/00, 13/00
U.S. Cl. 317—230                9 Claims

ABSTRACT OF THE DISCLOSURE

A thin film solid manganese dioxide electrolyte capacitor is provided characterized by a high working voltage and low dielectric loss, wherein the manganese dioxide electrolyte is formed as a decomposition product of manganese heptoxide. The method for producing the capacitor resides in passing a vapor of manganese heptoxide over the oxidized surface of the anode metal and causing the vapor to decompose and deposit a thin film of manganese dioxide on the oxidized anode metal surface.

---

Figure 1:
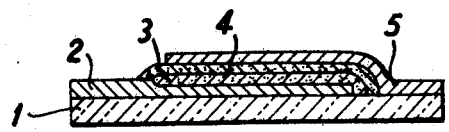

This invention relates to the so-called thin film solid electrolyte capacitors which comprise four layers; first layer is a metal electrode as capacitor anode, second layer is an oxide dielectric, third layer is a solid electrolyte and fourth layer is a metal electrode as capacitor cathode. As a capacitor anode electrode, valve metal (film-forming metal such as Ta, Al, W, Ti or Zr) is deposited on a glass or other insulating substrate by sputtering or vacuum deposition techniques and the valve metal film is anodically oxidized to form oxide film. This oxide film is used as a capacitor dielectric. Furthermore, on the oxide film, a thin manganese oxide film as solid electrolyte is formed, followed by the deposition of metal film as a cathode electrode by the conventional vacuum deposition techniques. This invention is featured in that the thin manganese oxide film is formed by decomposition of manganese heptoxide.

In the field of electronics, for the purpose of enchancing reliability of equipments and making the equipments more compact, thin film integrated circuits have been used. It is believed that the thin film circuits are growing in importance and will continue to grow in the future. Recently, many high reliable thin resistors, such as tantalum nitride thin film resistors and nichrome thin film resistors, have been developed. However, capacitors which are also indispensable components of the thin film integrated circuit have not been commercially used with a few exceptions. In particular, capacitors using anodic oxide film as their dielectric have not been reliable because of their large leakage current.

Electrolytic capacitors are advantageous in that they exhibit relatively large capacitance per unit area, because they use very thin anodic oxide films as dielectrics. Usually, it is believed that the electrolytic capacitors can be operated with a working voltage equivalent to about 75% of an anodizing voltage (a voltage under which a valve metal is anodized to form a thin anodic oxide film). However, to insure their stability in the operation, their leakage current must be limited to not more than $10^{-9}$ amp./cm.$^2$. In order to restrict the leakage current to this limit value or less, the working voltage must be reduced. For this reason, thin film electrolyte capacitors are usually used with a working voltage of 20% to 30% of the anodizing voltage. As the capacitance of the thin anodic oxide film is reciprocally proportional to the anodizing voltage, the capacitor which must be used with a reduced working voltage requires larger area for obtaining a certain capacitance than that which is used with a non-reduced working voltage.

In order to improve the leakage current and reliability of thin film electrolytic capacitors, a managnese dioxide layer has been incorporated into the capacitor between an anodic oxide film and a cathode electrode film. This manganese dioxide layer serves as solid electrolyte which oxidizes the defects of the dielectric film and hence reduces the leakage current due to the defects. The manganese dioxide layers have been formed by thermal decomposition of manganese nitrate or by sputtering of manganese in an oxygen atmosphere. By incorporation of the manganese dioxide layer, capacitor characteristics have been improved to some extent, but the possible working voltage of the capacitor has not been increased over 30% of the anodizing voltage.

When the manganese dioxide layer is formed on the anodic oxide film by thermal decomposition of manganese nitrate, the valve metal and the oxide film must be heated to 300° C. at least. During this heat treatment, a large number of small cracks and fissures are introduced in the oxide film, originated from the difference in the thermal expansion coefficients between the valve metal and the oxide film, with the result that there is an increase in the leakage current and in the deterioration of capacitor characteristics. Moreover, the manganese dioxide layers formed by thermal decomposition of manganese nitrate are very rough and non-uniform in thickness. In addition, it is difficult to deposit the manganese dioxide layer only on a definite portion and the layer which is deposited on the unwanted portion leads to an increase of the dielectric loss.

In the case where the manganese oxide film is formed by sputtering, the anodic oxide film is continuously bombarded by high energy electrons during the sputtering process, and many defects are induced in the film. Accordingly, the leakage current becomes rather larger after deposition of manganese oxide layer than before deposition thereof.

In the process of the invention, the manganese oxide layer as solid electrolyte is formed by decomposition of manganese heptoxide. Manganese heptoxide is very unstable and easily decomposed to form its lower oxide even at room temperature. The anodic oxide film can be coated with manganese oxide layer by decomposition of manganese heptoxide without undergoing any thermal deterioration of capacitor characteristics. The film thickness of manganese oxide formed by decomposition of manganese heptoxide can be controlled in the range from several tens angstroms to one micron by controlling deposition time. This film is uniform, very thin and free from pin holes and hence does not increase the dielectric loss of the capacitor. And the film can be deposited on the desired place by using a photo resist mask. According to the invention, the working voltage of the capacitor is improved to 50% or more of the anodizing voltage.

Manganese heptoxide ($Mn_2O_7$) is very volatile and resembles an oily liquid at room temperature. At a temperature of 40 to 50° C., it rapidly decomposes or explodes. Manganese heptoxide is readily decomposed by heat or water to form manganese dioxide ($MnO_2$) or manganese sesquioxide ($Mn_2O_3$). It has been confirmed that the manganese oxide formed at 150° C. (temperature of a substrate) from manganese heptoxide has specific resistivity as nearly as that of manganese dioxide, but its structure has not been identified by X-ray or electron diffraction analysis.

Figure 2:
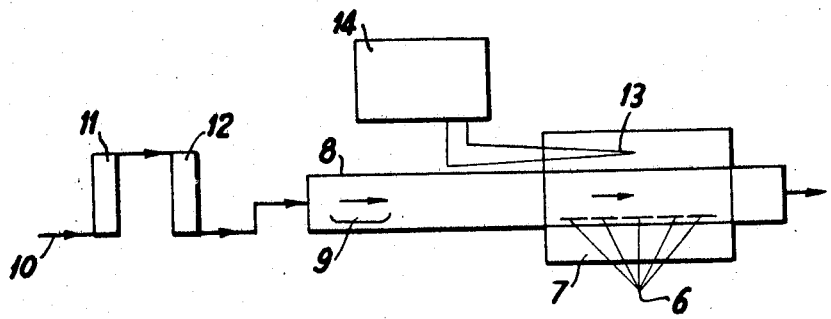
Figure 3:
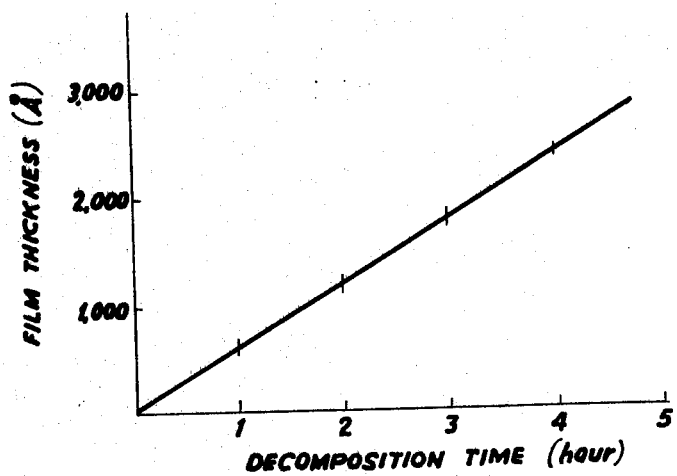

The above and other features and advantages of the invention will be apparent from the following more detailed description of a preferred embodiment of the invention, taken in conjunction with the accompanying drawings, wherein FIG. 1 is a schematic cross-sectional view of an example of a capacitor according to the invention; FIG. 2 is a schematic representation showing a process for the production of a manganese oxide film used on the capacitor according to the invention; and FIG. 3 is a graph showing the relationship between the thickness of manganese oxide film and the decomposition time of manganese heptoxide.

Referring to FIG. 1 which shows a sectional view of a capacitor according to a preferred embodiment of the invention, a valve metal film 2 is deposited on a glass plate 1 by cathode sputtering or vacuum deposition and anodically oxidized to form a dielectric oxide film 3. On these films, a manganese oxide film 4 is formed by decomposition of manganese heptoxide and a conductive material 5 is deposited thereon as the uppermost layer to serve a cathode electrode. The manganese oxide film 4 is formed by a process illustrated with reference to FIG. 2.

In FIG. 2, substrates 6 (glass plate 1 with valve metal film 2 and anodic oxide film 3) on which manganese oxide is to be deposited are placed in the quartz tube 8 externally heated by the resistance furnace 7. The furnace temperature is measured by thermocouple 13 and controlled by the controller 14. A quartz boat 9, filled with manganese heptoxide, is placed in the end portion of the quartz tube 8 and kept at or near room temperature. A carrier gas is flowed from 10 into the quartz tube 8 through a flow meter 11 and a gas drying column 12. In the figure, arrows indicate the flow direction of the carrier gas. Air, oxygen, nitrogen, argon, or other incombustible gas is used as a carrier gas. In the quartz tube, the vapor of manganese heptoxide is carried by the carrier gas and decomposed on the oxide films 3 of the valve metal to form the manganese oxide film 4. In this process, the deposition rate of the manganese oxide film is constant with constant gas flow rate, provided other conditions such as temperature of the furnace (or temperature of the substrate) and weight of manganese heptoxide are not changed. For example, deposition rate of 10 angstroms per minute can be obtained, where the furnace temperature (or substrate temperature) is 50° C., where 4 grams of manganese heptoxide are used, where the diameter of the quartz tube is 4 cm., and where the gas flow is 1.5 liters per minute (irrespective of the kind of the carrier gas used). Under these same conditions, relation shown in FIG. 3 is obtained between the thickness of the deposited manganese oxide film and the decomposition time of the vapor of manganese heptoxide. Thermal decomposition of the vapor of manganese heptoxide carried by a carrier gas depends on various factors, and the most predominant factor is a temperature of the substrate. The favorable range of the substrate temperature is from approximately 50° C. to 200° C.

EXAMPLE

On a borosilicate glass of 25 mm. x 25 mm. and 1 mm. thick, a tantalum film of about 4,000 angstrom thick is deposited by sputtering in $2 \times 10^{-2}$ torr. argon atmosphere. Anodic oxidation of the tantalum film is effected by using $1/100$ N aqueous solution of phosphoric acid with ¼ ma./cm.² current density until the cell voltage reaches 100 volt. With this voltage anodization is further continued for 2 hours. Thereafter, the oxidized tantalum film is rinsed with deionized water followed by drying. The substrate (the glass plate with tantalum film and tantalum oxide film) and 4 grams of managanese heptoxide are placed in the quartz tube, the former is kept at 50° C. while the latter at room temperature, and 1.5 l./min. of air is made to flow as a carrier gas. After deposition of manganese oxide for 30 min., the substrate with the manganese oxide film of 300 angstrom thick is taken out, and then a gold film of 1,000 angstrom thick is deposited as a cathode electrode of capacitor by vacuum deposition technique.

Working voltage, leakage current and dielectric loss of the capacitor thus obtained are 50 volts, $10^{-9}$ amp./cm.² and 2%, respectively. Whereas, the corresponding values are 30 volts, $10^{-9}$ amp./cm.² and 5%, respectively, in a capacitor having the same structure as that of this invention with the exception of a manganese oxide layer which is formed by thermal decomposition of manganese nitrate.

As will be apparent from the foregoing, the capacitors which have manganese oxide layer formed by the decomposition of managanese heptoxide can be used at higher working voltage. The capacitor produced by the invention has superior characteristics in dielectric loss, leakage current and reliability.

What is claimed is:
1. A capacitor comprising a film-forming anode metal, a dielectric film of an oxide of said anode metal constituting at least a portion of said anode metal, a solid electrolyte layer of manganese dioxide covering said dielectric film formed as a decomposition product of manganese heptoxide and a cathode metal covering said solid electrolyte.

2. The capacitor of claim 1, wherein the film-forming anode metal is selected from the group consisting of Ta, Al, W, Ti and Zr, and wherein the cathode metal is gold.

3. A method of producing a thin film solid manganese oxide electrolyte capacitor characterized by working voltages of up to 50% improvement and higher and low dielectric loss which comprises, providing an anode metal having on the surface thereof a dielectric oxide film of said anode metal, depositing a manganese dioxide film on said dielectric oxide film by the decomposition of manganese hepoxide, and then forming a cathode metal film on said manganese dioxide film.

4. The method of claim 3, wherein said anode metal is selected from the group consisting of Ta, Al, W, Ti and Zr, and wherein said dielectric film is produced on said anode metal by anodic oxidation.

5. The method of claim 4, wherein said cathode metal is gold.

6. The method of producing a thin film solid manganese oxide electrolyte capacitor characterized by working voltages of up to 50% and higher and low dielectric loss which comprises, providing an anode metal selected from the group consisting of Ta, Al, W, Ti and Zr, anodically oxidizing a surface of said anode metal, flowing a vapor of manganese heptoxide over said oxidized surface and decomposing said vapor whereby to deposit a layer of manganese dioxide on said oxidized surface and then depositing a film of cathode metal on said layer of managanese dioxide.

7. The method of claim 6, wherein the temperature of the anode metal before applying the manganese dioxide layer is maintained at a temperature ranging from about 50° C. to 200° C.

8. The method of claim 7, wherein the anode metal is Ta and the cathode metal is gold.

9. The method of claim 7, wherein the decomposition of manganese heptoxide is carried out to produce manganese dioxide thicknesses ranging up to about one micron.

References Cited

UNITED STATES PATENTS

| 3,054,029 | 9/1962 | Wagner et al. | 317—230 |
| 3,100,329 | 8/1963 | Sherman | 317—230 |
| 3,123,894 | 3/1964 | Von Bonin | 317—230 |
| 3,166,693 | 1/1965 | Haring et al. | 317—230 |
| 3,397,446 | 8/1968 | Sharp | 29—570 |

JAMES D. KALLAM, Primary Examiner

U.S. Cl. X.R.

29—570